United States Patent
Varga

(10) Patent No.: US 6,654,471 B1
(45) Date of Patent: Nov. 25, 2003

(54) METHOD, EQUIPMENT AND RECORDING DEVICE FOR SUPPRESSING PULSED INTERFERENCE IN ANALOGUE AUDIO AND/OR VIDEO SIGNALS

(75) Inventor: Imre Varga, München (DE)

(73) Assignee: Thomson Licensing, S.A., Boulogne-Billancourt (FR)

(*) Notice: Subject to any disclaimer, the term of this patent is extended or adjusted under 35 U.S.C. 154(b) by 0 days.

(21) Appl. No.: 09/097,909

(22) Filed: Jun. 16, 1998

(30) Foreign Application Priority Data

Jun. 26, 1997 (DE) .......................... 197 27 133

(51) Int. Cl.$^7$ .......................... H04B 15/00; H04H 5/00
(52) U.S. Cl. .................. 381/94.8; 381/94.4; 381/13; 381/94.1
(58) Field of Search ............... 381/94.8, 94.4, 381/13, 94.1

(56) References Cited

U.S. PATENT DOCUMENTS

| 4,376,289 A | * | 3/1983 | Reitmeier et al. | ........... 348/616 |
| 4,647,972 A | * | 3/1987 | Strehl | .......................... 348/616 |
| 5,586,192 A | * | 12/1996 | De Bijl | ........................ 381/94 |
| 5,703,904 A | | 12/1997 | Langberg | |

FOREIGN PATENT DOCUMENTS

| DE | 3415648 | 10/1985 | ........... H04B/15/00 |
| DE | 4036730 | 5/1992 | ............ H03G/3/00 |

* cited by examiner

Primary Examiner—Forester W. Isen
Assistant Examiner—Elizabeth McChesney
(74) Attorney, Agent, or Firm—Joseph S. Tripoli; Reitseng Lin

(57) ABSTRACT

Clicks in voice and music signals are removed by detecting and interpolating the click. The use of a permanently set threshold value above the peak value of the audio signal is known for detecting the clicks, and interpolation carried out on the basis of the sample values before and after a click is known for filling them in. Disadvantages of these methods are, on the one hand, that many clicks do not have a larger amplitude than the peak signal and therefore remain undetected, and, on the other hand, interpolation is a highly complex procedure and is limited to a maximum click density. The invention provides for an error signal ($e_n$) to be determined by adaptive filtering (AF). A sample value is designated as distorted in the input signal ($x_n$) if the absolute instantaneous value in the error signal ($e_n$) exceeds a dynamically adapted threshold value. The output signal of the adaptive filtering ($y_n$) is used as a substitute value for the sample value designated as distorted, specifically both in the case of the signal which is output and in the input values of the adaptive filtering.

8 Claims, 1 Drawing Sheet

Figure 1:
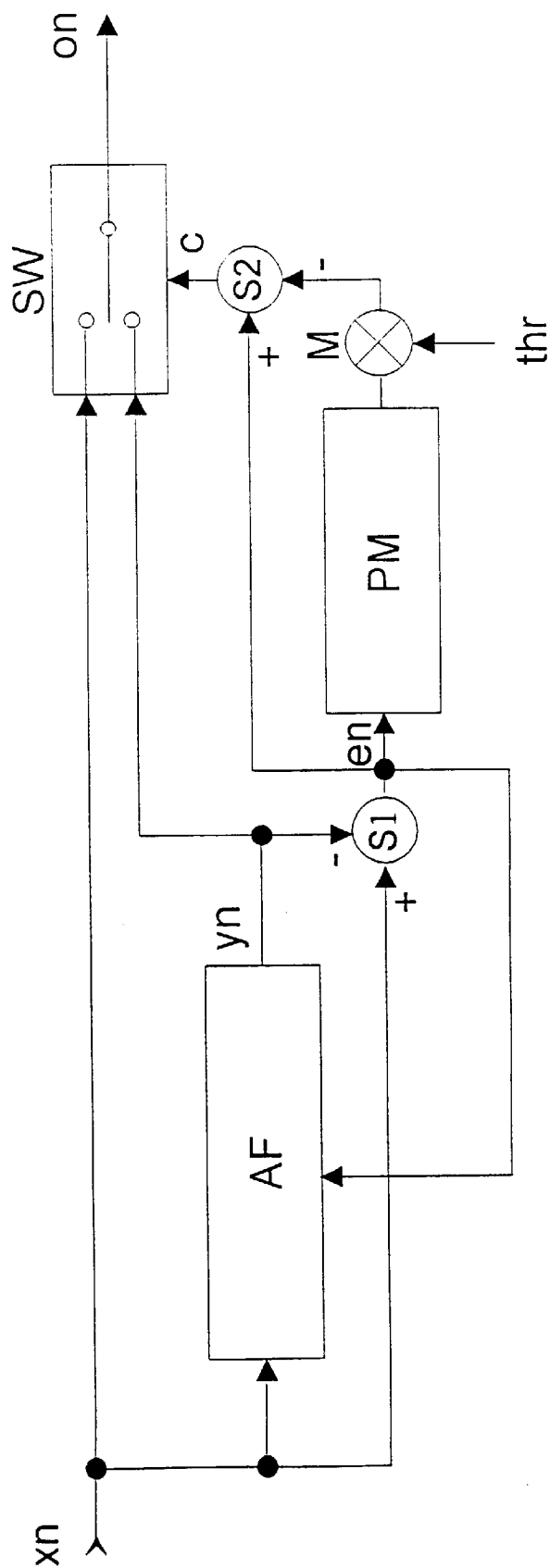

METHOD, EQUIPMENT AND RECORDING DEVICE FOR SUPPRESSING PULSED INTERFERENCE IN ANALOGUE AUDIO AND/OR VIDEO SIGNALS

The invention relates to a method, equipment and a recording device for suppressing pulsed interference in analogue audio and/or video signals, particularly for suppressing clicks during playback of old sound carriers.

1. Prior Art

Pulsed interference (called clicks below) can occur in voice and music signals originating from a wide variety of sources. These can be old sound carriers, such as old shellacs (gramophone records), LPs, audio tapes, audio or video cassettes, as well as film sound or multipath transmission paths. These offending clicks are usually removed in two steps: detection of the click and interpolation, i.e. filling in the click. A. known method of detection is the use of a permanently set threshold value above the peak value of the audio signal. One limitation of this method is that many clicks do not have a larger amplitude than the peak signal and therefore remain undetected. In the past, the clicks have been filled in by carrying out linear or else higher-order interpolation based on the sample values before and after the gap caused by the click. In this case, the signal is not reproduced in the gap. Quality is improved by using so-called random interpolation, in which a model of the audio signal is used.

Such a method is described in GB 2 217 902. Here, a mathematical model is initially calculated from the undistorted data before and after the click. This autoregressive model is then used to fill in the click. Specifically, this method takes the undistorted data before the click and uses the model to determine prediction values at the point of the click and after the click. The values at the point of the click are then changed in such a way that the error for the data after the click becomes minimal. A clear disadvantage of this method is the high complexity arising from the fact that the order of the model must correspond to about twice the number of sample values to be filled in. A further disadvantage is that the method does not work correctly beyond a certain click density, because there are then no longer sufficient undistorted data available for calculating the mathematical model. Furthermore, the method produces a noticeable delay which can be a disadvantage in certain cases.

2. Invention

The invention is based on the object of providing a method for suppressing pulsed interference in audio or video signals. This object is achieved by the method specified in claim 3.

The invention is based on the further object of providing equipment for suppressing pulsed interference in audio or video signals. This object is achieved by the equipment specified in claim 7.

Finally, the invention is based on the further object of providing a recording device for suppressing pulsed interference in audio or video signals. This object is achieved by the recording device specified in claim 1.

In principle, the essence of the method according to the invention for suppressing pulsed interference in analogue audio and/or video signals, sample values being formed from the analogue audio and/or video signals and being used as an input signal, and undistorted sample values before or after the interference being used to suppress the interference, is that adaptive filtering is carried out and is used both for detecting and for interpolating the pulsed interference, in which case the adaptive filtering of the input signal is used to determine an error signal, a sample value in the input signal is designated as distorted if the absolute instantaneous value of the error signal exceeds a threshold value, the output signal of the adaptive filtering is used as a substitute value for the sample value designated as distorted, the sample value designated as distorted is also replaced in the input values of the adaptive filtering.

A significant difference from the method described in GB 2 217 902 is that a mathematical model (AR, autoregressive) is explicitly calculated in the latter case, based on the undistorted data (sample values) before the click. In contrast, the method according to the invention makes it possible to dispense with the complex calculation of a mathematical model. The use of an adaptive filter involves no direct mathematical signal modelling. Hence, the method according to the invention is remarkably less complex and thus permits real-time declicking. Furthermore, it can also be used with a high click density and can therefore be used as a decrackler in order to suppress crackling, i.e. high-density pulsed interference. This produces superb results in comparison to other methods, as audio testing has also shown.

In the method according to the invention, it is advantageous that no change is made in the signal path if the absolute sample value in the error signal is below the respective threshold value.

It is particular advantageous if the adaptation of the adaptive filtering is carried out only at the discrete instants. at which the sample value in the input signal is designated as undistorted.

In addition, the adaptation is preferably suspended if the sample value in the input signal has been designated as distorted.

It is likewise advantageous to continue the measurement of the power of the error signal and/or of the input signal only for sample values which have been recognized as undistorted.

Finally, it is particularly advantageous to match the threshold value dynamically to the level characteristic.

In principle, the essence of the equipment according to the invention for suppressing pulsed interference in analogue audio and/or video signals, to which equipment sample values formed from the analogue audio or video signals are fed as the input signal, undistorted sample values before or after the interference being used to be able to output an output signal with suppressed interference, is an adaptive filter for detecting and interpolating the pulsed interference, having the sample values of the input signal fed to it and being used to determine an estimated value for a future sample value and, from this, an error signal, a unit for determining the instantaneous value of the error signal, a changeover switch which switches between the estimated value and a sample value designated as distorted.

It is advantageous in this case that the sample value designated as distorted is also replaced in the input vector of the adaptive filter.

In principle, the essence of the recording device according to the invention for suppressing pulsed interference in analogue audio and/or video signals and digitally recording these audio and/or video signals, is an analogue/digital converter for forming sample values from the analogue audio and/or video signals, declicking equipment according to claim 7, to which equipment the sample values for suppressing pulsed interference are fed, recording equipment for recording on a digital data carrier, to which equipment the output signal of the declicking equipment is fed directly or after further processing.

Advantageously, the recording device additionally has a playback device for analogue data carriers, the analogue audio and/or video signals recorded on these analogue data carriers being fed to the analogue/digital converter during playback of the analogue data carriers.

DRAWING

An exemplary embodiment of the invention is described on the basis of FIG. 1, which shows:

a block diagram of an arrangement according to the invention for detecting and filling in clicks.

EXEMPLARY EMBODIMENTS

FIG. 1 illustrates a block diagram of an arrangement according to the invention for detecting and interpolating clicks. Detection and interpolation is carried out in one step here, using the same adaptive filter. An adaptive filter AF acting as a linear forward predictor is fed the input signal $x_n$. In doing so, the signal may, if required, be delayed beforehand by a delay stage. The filter AF decorrelates the input signal and delivers the output signal $y_n$ after filtering and/or evaluation. The error signal $e_n$ is then determined from the input signal $x_n$ and the output signal $y_n$ by means of a summer S1. The clicks in this error signal are therefore markedly more pronounced in relation to the level of the useful signal, with the result that the click can be detected with much more precision than in the original signal.

A sample value in the input signal $x_n$ is designated as distorted if the absolute instantaneous value of the error signal $e_n$ exceeds a threshold value. This threshold value is dynamically matched to the level characteristic in order to make click detection possible even in quiet passages, according to audibility.

In this instance, the threshold value can be calculated as the scaled version of the estimated power of the error signal $e_n$. For this purpose, the estimated power of the error signal $e_n$ is determined in the unit pm. The multiplier M then multiplies the resultant value by the constant scaling factor thr to produce the threshold value. The threshold value is then deducted from the instantaneous value of the error signal $e_n$ by the summer S2 to produce a control signal c.

A click is filled in by the output signal of the adaptive filter $y_n$ being used as a substitute value for the sample value $x_n$, designated as distorted, in the signal path. For this purpose, both signals are fed to a changeover switch SW which outputs one of the two signals as an output signal $o_n$, depending on the control signal c. In addition, the relevant sample value is in this case also replaced in the input vector of the adaptive filter, with the result that the adaptive filter works on the corrected signal. Conversely, if the absolute value of the sample value in the error signal $e_n$ is below the respective threshold value, no change is carried out in the signal path, i.e. the output signal $o_n$ of the declicker then corresponds to the input signal $x_n$.

The adaptation of the adaptive filter is carried out only at the discrete instants at which the sample value in the input signal has been designated as undistorted. If it has been designated as distorted, adaptation is suspended. Similarly, the measurement of the power of the error signal and of the input signal is continued only for sample values which have been recognized as undistorted.

To implement the invention, various special filter structures, such as adaptive FIR and IIR filters, and various special adaptation algorithms (NLMS, RLS, FTF, Feintuch etc.) can be used in a variety of combinations. Particularly good results are achieved in this case by, for example, the use of an adaptive NLMS-FIR filter as a forward predictor with a length of 30–50 taps at a sampling rate of 48 kHz.

Such an adaptive NLMS-FIR filter uses a special LMS (least mean squares) algorithm for adapting the coefficients h1, h2, . . . , hN of the FIR filter on the basis of the following equation:

$$hi(n+1)=hi(n)+a*e(n)*x(n-i)/Px(n)$$

$$i=1, 2, \ldots, N$$

where the variables are defined as follows
   n: discrete time index
   a: step size
   x: sample value of the input signal
   e: error signal
      where $$e(n) \approx x(n)-y(n),$$

y(n): signal at the FIR filter output
   Px: power of the signal x.

The power of the input signal $x_n$ to be normalized in the NLMS can in this case be measured by a first-order low-pass filter having a transfer function of the form $H(z) \approx (1-q)/(1-q*z^{\wedge}(-1))$. A further low-pass filter with the same structure can be used to measure the power of the error signal $e_n$ for calculating the threshold value.

The invention can be used during playback and/or rerecording of recorded voice and music signals (records, audio tapes), multipath communication systems, cellular digital telephone systems etc. In particular it is possible to use it in various recording devices in entertainment electronics, such as MD players, DVD players for rerecordable video disks or DVC devices, which can be separate devices but can also be combined with other entertainment electronics devices such as audio tape players or cassette recorders, or can be part of a personal computer. In addition, the equipment according to the invention can also be constructed as a seperate device for suppressing clicks.

Finally, the invention is not limited to audio signals but can also be used for video signals.

What is claimed is:

1. Recording device for suppressing pulsed interference in analogue audio samples and digitally recording these audio signals, comprising:

an analogue/digital converter for forming sample values from the analog audio signals;

an apparatus to which the sample values for suppressing pulsed interference are fed, said apparatus comprising means for receiving samples of the audio signal, means for adaptively filtering said received samples, means for deriving an error signal given by the difference between said received samples and said adaptively filtered samples, means for measuring the power of said error signal, means for calculating a threshold value using said error signal power, means for designating a sample as distorted if the error signal exceeds said threshold value, and means for replacing said distorted sample by the output signal of said adaptive filtering; and recording equipment for recording on a digital data carrier, to which equipment the output signal of said apparatus is fed directly or after further processing.

2. Recording device according to claim 1, wherein:

the device additionally has a playback device for analogue carriers, the analogue audio signal recorded on these analogue data carriers being fed to the analogue/digital converter during playback of the analogue data carriers.

3. Method for suppressing pulsed interferences in audio signal, comprising:

receiving samples of the audio signal;

adaptively filtering said received samples;

deriving an error signal given by the difference between said received samples and said adaptively filtered samples;

measuring the power of said error signal;

calculating a threshold value using said error signal power;

designating a sample as distorted if the error signal exceeds said threshold value; and replacing said distorted sample by the output signal of said adaptive filtering.

4. Method according to claim 3, wherein:

the adaptation of the adaptive filtering is carried out only at the discrete instants at which the sample value in the input signal is designated as undistorted.

5. Method according to claim 3, wherein:

the adaptation is suspended if the sample value in the input signal has been designated as distorted.

6. Method according to claim 3, wherein:

the measurement of the power of the error signal and/or of the input signal is continued only for sample values which have been recognized as undistorted.

7. Apparatus for suppressing pulsed interferences in an audio signal, comprising:

means for receiving samples of the audio signal;

means for adaptively filtering said received samples;

means for deriving an error signal given by the difference between said received samples and said adaptively filtered samples;

means for measuring the power of said error signal;

means for calculating a threshold value using said error signal power;

means for designating a sample as distorted if the error signal exceeds said threshold value; and means for replacing said distorted sample by the output signal of said adaptive filtering.

8. Apparatus according to claim 7, wherein:

the sample value designated as distorted is also replaced in the input vector of the means for adaptively filtering.

\* \* \* \* \*